(12) United States Patent
Schiftan et al.

(10) Patent No.: US 9,150,187 B1
(45) Date of Patent: Oct. 6, 2015

(54) CURTAIN AIRBAG ASSEMBLY

(71) Applicant: Nissan North America, Inc., Franklin, TN (US)

(72) Inventors: Ari Schiftan, Royal Oak, MI (US); Sarah Verner, Brighton, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 14/319,278

(22) Filed: Jun. 30, 2014

(51) Int. Cl.
*B60R 21/232* (2011.01)
*B60R 21/233* (2006.01)
*B60R 21/231* (2011.01)

(52) U.S. Cl.
CPC ............ *B60R 21/233* (2013.01); *B60R 21/232* (2013.01); *B60R 21/23138* (2013.01); *B60R 2021/23308* (2013.01)

(58) Field of Classification Search
CPC ............ B60R 21/23138; B60R 21/232; B60R 21/233; B60R 2021/01211; B60R 2021/01231; B60R 2021/23308; B60R 2021/26058
USPC ............................................. 280/729, 730.2
See application file for complete search history.

(56) References Cited

U.S. PATENT DOCUMENTS

| | | | |
|---|---|---|---|
| 3,843,150 A | 10/1974 | Harada et al. | |
| 5,730,464 A * | 3/1998 | Hill | 280/743.2 |
| 6,042,141 A * | 3/2000 | Welch et al. | 280/729 |
| 6,152,481 A * | 11/2000 | Webber et al. | 280/730.2 |
| 6,293,581 B1 * | 9/2001 | Saita et al. | 280/730.2 |
| 6,296,276 B1 * | 10/2001 | Ritter | 280/743.2 |
| 6,851,706 B2 * | 2/2005 | Roberts et al. | 280/730.1 |
| 6,854,763 B2 | 2/2005 | Dinsdale et al. | |
| 7,192,051 B2 | 3/2007 | Takahara | |
| 7,264,269 B2 | 9/2007 | Gu et al. | |
| 7,316,415 B2 * | 1/2008 | Jamison | 280/729 |
| 7,350,804 B2 * | 4/2008 | Bakhsh et al. | 280/730.2 |
| 7,360,790 B2 | 4/2008 | Hasebe et al. | |
| 7,396,043 B2 | 7/2008 | Choi et al. | |
| 7,611,164 B2 * | 11/2009 | Kai et al. | 280/729 |
| 7,661,702 B2 * | 2/2010 | Ochiai et al. | 280/730.2 |
| 7,828,322 B2 * | 11/2010 | Breuninger et al. | 280/730.2 |
| 7,954,844 B2 * | 6/2011 | Kamiyama | 280/729 |
| 7,988,187 B2 * | 8/2011 | Yamamura et al. | 280/730.2 |
| 8,020,888 B2 | 9/2011 | Cheal et al. | |
| 8,414,021 B2 | 4/2013 | Tanaka et al. | |
| 8,746,734 B1 * | 6/2014 | Smith et al. | 280/730.2 |
| 8,876,153 B2 * | 11/2014 | Dix | 280/729 |
| 8,882,139 B2 * | 11/2014 | Kawamura et al. | 280/730.2 |
| 8,967,660 B2 * | 3/2015 | Taguchi et al. | 280/729 |
| 2015/0097359 A1 * | 4/2015 | Rickenbach et al. | 280/729 |

* cited by examiner

*Primary Examiner* — Laura Freedman
(74) *Attorney, Agent, or Firm* — Young, Basile, Hanlon & MacFarlane, P.C.

(57) ABSTRACT

A curtain airbag for providing multiple coverage areas over a window opening includes a shared panel and first and second auxiliary panels. The shared panel is sized to span the height of a window opening upon the curtain airbag's deployment, and has an upper periphery, an opposing lower periphery and a central portion between the upper periphery and the lower periphery. The first auxiliary panel is connected to the shared panel at least along its upper periphery and along its central portion to define a first inflatable chamber configured for inflation to at least partially provide a first coverage area. The second auxiliary panel is connected to the shared panel at least along its lower periphery and along one of its central portion or its upper periphery to define a second inflatable chamber configured for inflation to at least partially provide a second coverage area.

18 Claims, 8 Drawing Sheets

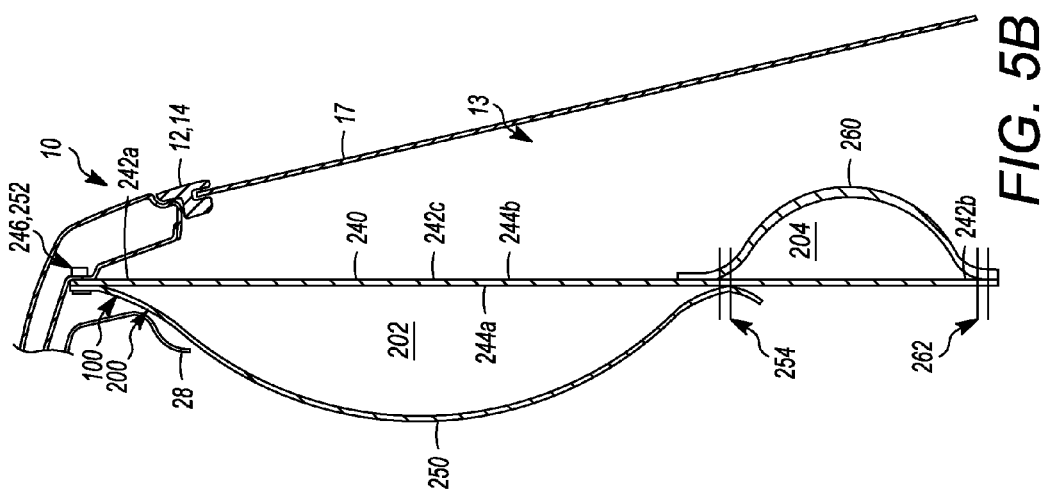
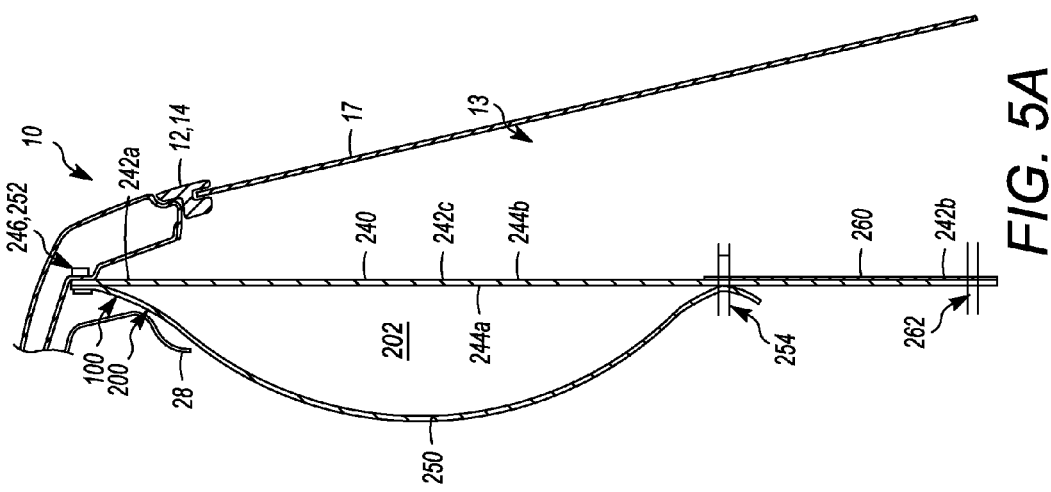

CURTAIN AIRBAG ASSEMBLY

TECHNICAL FIELD

The disclosure relates to the field of inflatable restraints for automobiles.

BACKGROUND

Inflatable restraint devices commonly called airbags are standard equipment on most new vehicles. In early implementations of airbag systems, vehicles were equipped with one or more airbags that would deploy from forward-facing regions such as the steering wheel and the passenger side of the instrument panel.

In more recent implementations, additional airbags have been employed in different areas of the vehicle. For example, curtain airbags have been utilized to provide energy dissipation capacity along the sides of vehicles. Curtain airbags have been employed in areas adjacent to the roof rail and headliner or the side doors. These curtain airbag devices are typically concealed from occupant view prior to deployment by interior trim panels associated with the roof rail and/or headliner. When a curtain airbag is deployed, it is inflated with a gas, which pressurizes the curtain airbag and induces surface tension in the material from which the curtain airbag is fabricated.

SUMMARY

Disclosed herein are embodiments of curtain airbags and vehicles with curtain airbags. In one aspect, a curtain airbag for providing multiple coverage areas over a window opening includes a shared panel sized to span the height of a window opening upon the curtain airbag's deployment, the shared panel having an upper periphery, an opposing lower periphery and a central portion between the upper periphery and the lower periphery. A first auxiliary panel is connected to the shared panel at least along its upper periphery and along its central portion to define a first inflatable chamber configured for inflation to at least partially provide a first coverage area. A second auxiliary panel is connected to the shared panel at least along its lower periphery and along one of its central portion or its upper periphery to define a second inflatable chamber configured for inflation to at least partially provide a second coverage area.

In another aspect, a vehicle includes a body structure defining a window opening. A curtain airbag provides multiple coverage areas over the window opening. The curtain airbag includes a shared panel and first and second auxiliary panels. The shared panel is sized to span the height of a window opening upon the curtain airbag's deployment. The shared panel has an upper periphery, an opposing lower periphery and a central portion between the upper periphery and the lower periphery. The first auxiliary panel is connected to the shared panel at least along its upper periphery and along its central portion to define a first inflatable chamber configured for inflation to at least partially provide a first coverage area. The second auxiliary panel is connected to the shared panel at least along its lower periphery and along one of its central portion or its upper periphery to define a second inflatable chamber configured for inflation to at least partially provide a second coverage area. A system for deploying the curtain airbag is configured to separately inflate the first inflatable chamber and the second inflatable chamber.

In yet another aspect, a curtain airbag for providing multiple coverage areas over a window opening includes a shared panel and at least two overlying auxiliary panels connected to the shared panel. The auxiliary panels define, with the shared panel, respective inflatable chambers configured for inflation to at least partially provide respective coverage areas. The respective inflatable chambers are fluidly isolated from one another and define respective inflation apertures for receiving inflation gas.

These and other aspects will be described in additional detail below.

BRIEF DESCRIPTION OF THE DRAWINGS

The description herein makes reference to the accompanying drawings wherein like referenced numerals refer to like parts throughout the several views, and wherein:

FIGS. 5A and 5B are rear sectional views of the vehicle taken along the line A-A in FIG. 3 showing the curtain airbag assembly during deployment of the curtain airbag according to a first example construction;

DETAILED DESCRIPTION

The curtain airbags employed along the sides of vehicles, or so called side curtain airbags, may be utilized to provide coverage over a vehicle's side window opening. The vehicle according to the description that follows includes a single side curtain airbag that can be employed to provide multiple different coverage areas over the vehicle's side window opening. In an exemplary application, for instance, the multiple different coverage areas accommodate different events. The side curtain airbag according to the following examples includes a shared panel. Multiple overlying auxiliary panels are connected to the shared panel to define respective inflatable chambers configured for inflation to at least partially provide respective coverage areas.

Although the following examples are directed to a side curtain airbag, it will be understood that these examples are non-limiting. The disclosed construction and operation of the side curtain airbag is equally applicable in principle, for instance, to other curtain airbags utilized to provide coverage over other window openings or in other parts of the vehicle.

Figure 1:
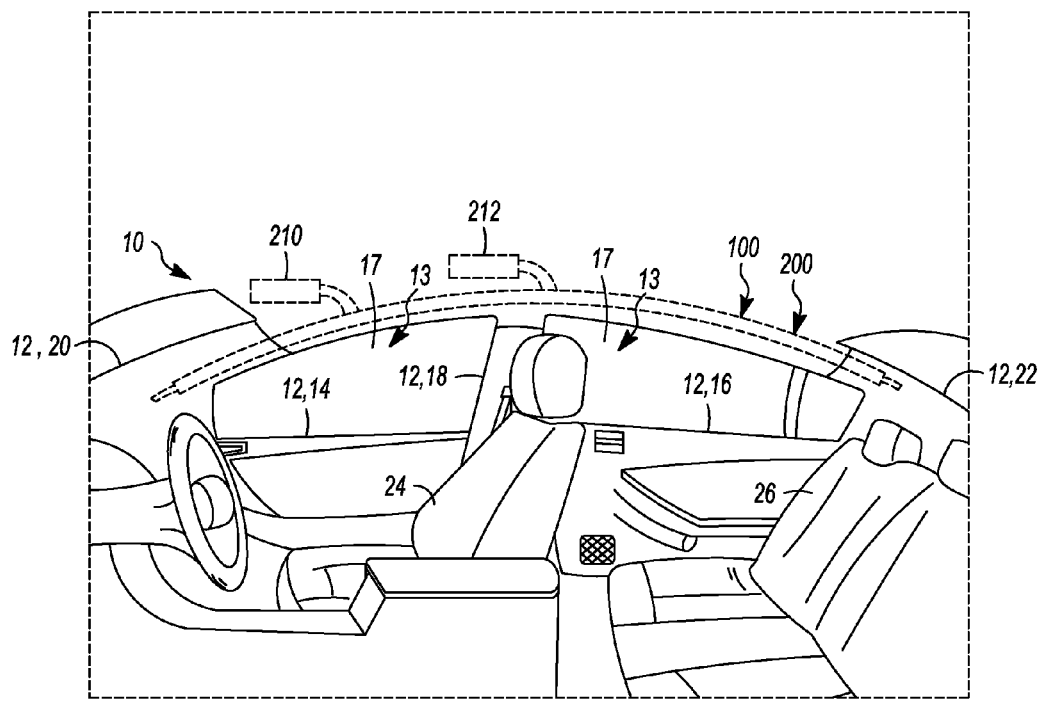
FIG. 1 is a side view of an interior of a vehicle having a window opening and equipped with a curtain airbag assembly including a curtain airbag for providing multiple coverage areas over the window opening.
Figure 2:
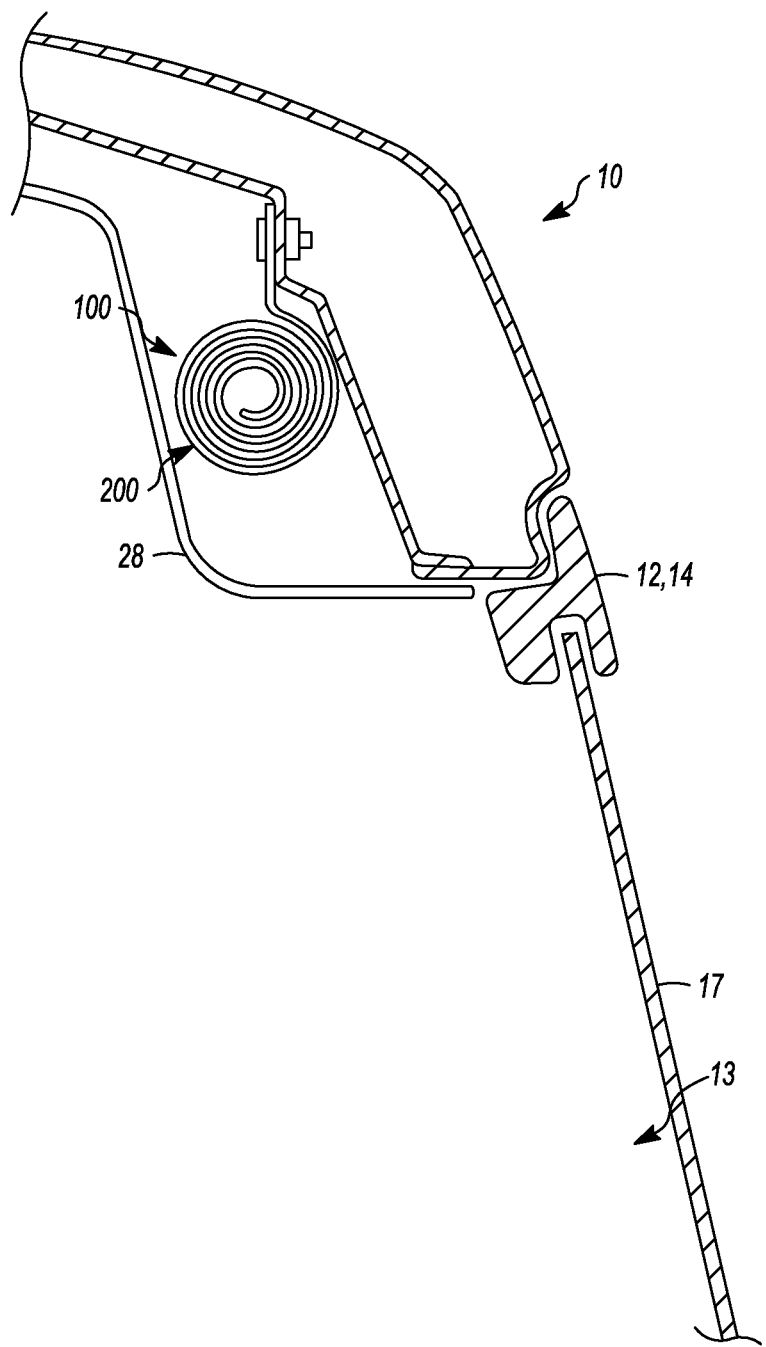
FIG. 2 is a schematic rear sectional view of the vehicle showing the curtain airbag in a pre-deployment position.
Figure 3:
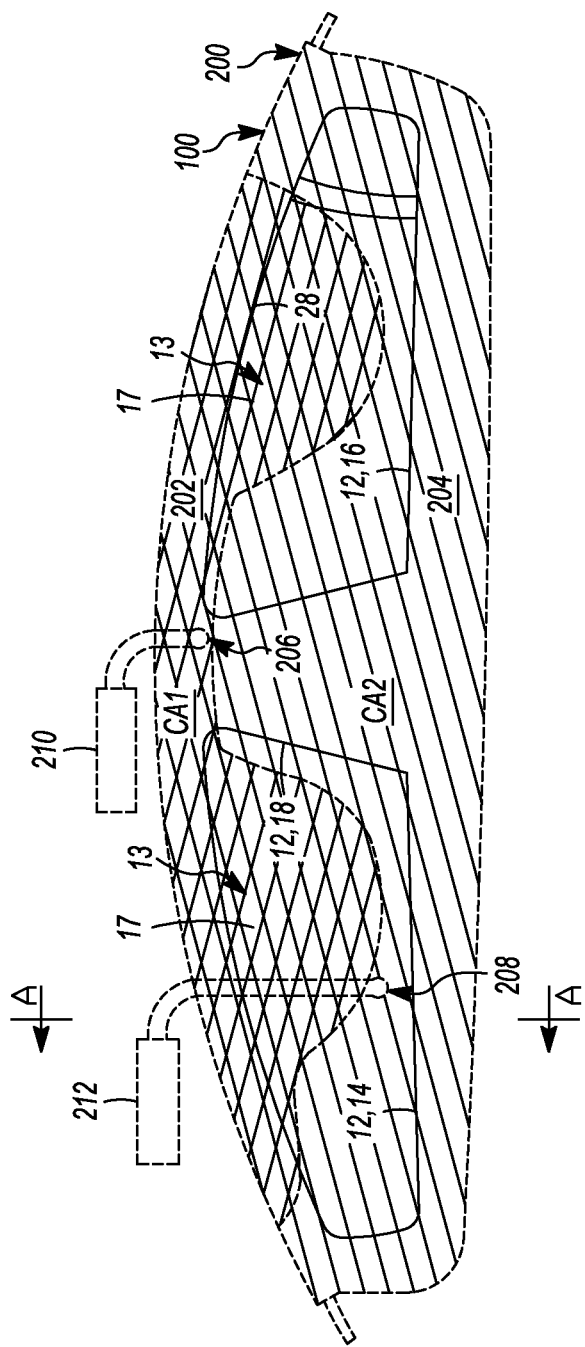
FIG. 3 is a partial side view of the interior of a vehicle showing the curtain airbag assembly during deployment of the curtain airbag, and showing examples of coverage areas provided over the window opening by the curtain airbag.

FIGS. 1-3 show a vehicle 10 having a restraint system that includes a side curtain airbag assembly 100 having a curtain airbag 200. The vehicle 10 may include a body structure 12 that is at least partially open to define one or more window openings 13. The body structure 12 may include a front door 14 and a rear door 16, each of which define a respective window opening 13 and accommodates a window 17. The front door 14 and the rear door 16 can be separated from one another by an interior structural pillar or B-pillar 18 of the vehicle body structure 12. A front structural pillar or A-pillar 20 of the vehicle body structure 12 is disposed forward of the front door 14. A rear structural pillar or C-pillar 22 of the vehicle body structure 12 is disposed rearward of the rear door 16. The A-pillar 20, the B-pillar 18, and the C-pillar 22 can each be covered by trim panels.

Front seats 24 are positioned adjacent to the front door 14, and rear seats 26 are positioned adjacent to the rear door 16. The side curtain airbag assembly 100 could be used with other vehicles, such as vehicles that do not include a rear door 16 but include rear seats 26, or vehicles that lack both a rear door 16 and rear seats 26.

According to the example of the vehicle 10 with the illustrated body structure 12 and configuration of the side curtain airbag assembly 100, as used in the discussion of the curtain airbag 200 of the side curtain airbag assembly 100, the term window opening 13 can refer generally to the combination of the window openings 13 defined by the front door 14 and the rear door 16. For other examples of the vehicle 10 and/or configurations of the side curtain airbag assembly 100, the term window opening 13 could refer generally to an individual window opening 13 or to different combinations of window openings 13, including those not defined by the front door 14 or the rear door 16.

As shown in FIGS. 1 and 2, prior to deployment, the side curtain airbag assembly 100 is disposed in a pre-deployment position. In the pre-deployment position, the curtain airbag 200 of the side curtain airbag assembly 100 can be hidden from view within the interior of the vehicle 10. The curtain airbag 200 can be folded, rolled, or otherwise compressed into a compact state when the side curtain airbag assembly 100 is disposed in its pre-deployment position. For example, in the illustrated embodiment, the curtain airbag 200 and other components of the side curtain airbag assembly 100 are disposed at least partially behind a headliner 28 of the vehicle 10, with the curtain airbag 200 extending underneath the headliner 28 along the longitudinal direction of the vehicle 10, just above the front door 14 and the rear door 16 as well as the B-pillar 18.

During deployment of the curtain airbag 200, the curtain airbag 200 is inflated. Specifically, the curtain airbag 200 includes multiple internal inflatable chambers, as described below, which are individually inflated by the selective rapid introduction of inflation gas. The inflation causes the headliner 28 to be displaced, such as by bending the headliner 28, thereby exposing the curtain airbag 200 to the passenger compartment of the vehicle 10. The inflation further causes the curtain airbag 200 to enter the passenger compartment of the vehicle 10.

Upon the entry of the curtain airbag 200 into the passenger compartment of the vehicle 10, the curtain airbag 200 can provide multiple coverage areas over the window opening 13. The multiple coverage areas can be configured to accommodate respective different events for the vehicle 10. The multiple coverage areas can be fully or partially contiguous to one another, separate from one another or overlapping, depending, for instance, upon the purpose of providing the coverage areas.

In the implementation shown in FIG. 3, the curtain airbag 200 is configured to provide a first coverage area CA1 and a second coverage area CA2 over the window opening 13. The first coverage area CA1 is generally different from the second coverage area CA2. That is, the first coverage area CA1 provides different coverage over the window opening 13 than the second coverage area CA2.

According to the illustrated example, the first coverage area CA1 generally extends in the longitudinal direction of the vehicle 10 along and optionally above the upper portions of the window opening 13, and particularly includes portions providing coverage over the portions of the window opening 13 adjacent the front seat 24 and the rear seat 26. The second coverage area CA2 generally extends in the longitudinal direction of the vehicle 10 and spans the height of the window opening 13 to provide coverage over the entirety of the window opening 13, and optionally above the upper portions of the window opening 13 and below the lower portions of the window opening 13. Accordingly, in this example, the second coverage area CA2 overlaps the first coverage area CA1, as generally shown.

The curtain airbag 200 can be constructed to define multiple internal inflatable chambers that individually, or in collaboration, at least partially provide the first coverage area CA1 and the second coverage area CA2 upon inflation and the ensuing entry of the curtain airbag 200 into the passenger compartment of the vehicle 10. In the illustrated example, the curtain airbag 200 is constructed to include a first inflatable chamber 202 configured for inflation to at least partially provide the first coverage area CA1, and a second inflatable chamber 204 configured for inflation to at least partially provide the second coverage area CA2. As shown, in order to support the inflation of the curtain airbag 200, the first inflatable chamber 202 defines an inflation aperture 206, and the second inflatable chamber 204 defines an inflation aperture 208.

Figure 4:
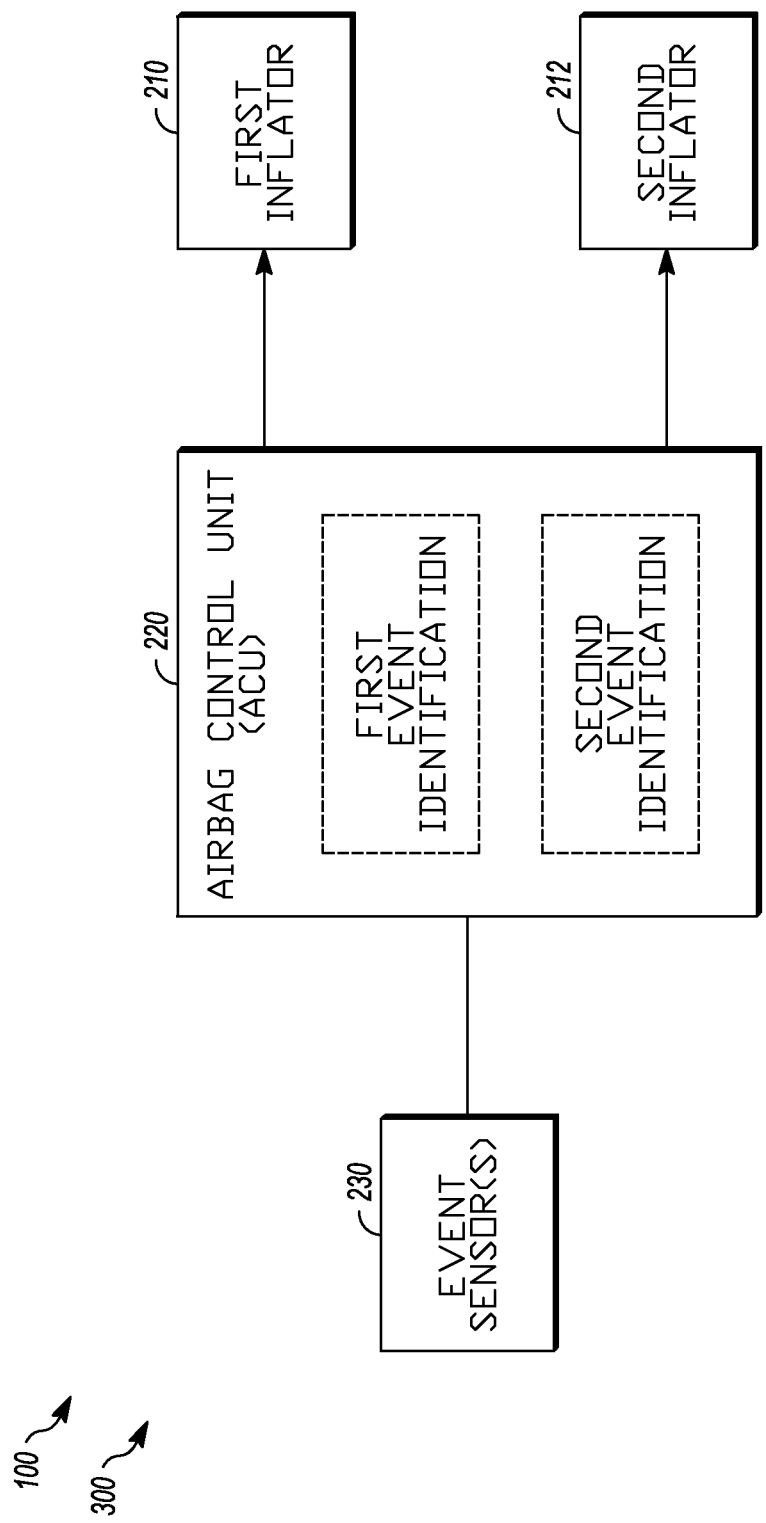
FIG. 4 is a schematic of a system for deploying the curtain airbag.

As shown with additional reference to FIG. 4, the side curtain airbag assembly 100 includes a system 300 for deploying the curtain airbag 200. The system 300 for deploying the curtain airbag 200 is generally configured to sense environmental conditions for the vehicle 10, identify one, some or all of the events for the vehicle 10 for which the first coverage area CA1 and the second coverage area CA2 are configured to accommodate based on the sensed environmental conditions, and in response to the identified events, selectively inflate the first inflatable chamber 202 and/or the second inflatable chamber 204.

The system 300 for deploying the curtain airbag 200 includes a first inflator 210 fluidly coupled to the first inflatable chamber 202 through the inflation aperture 206, and a second inflator 212 fluidly coupled to the second inflatable chamber 204 through the inflation aperture 208. The first inflator 210 and the second inflator 212 are configured to rapidly produce inflation gas for provision to the first inflatable chamber 202 and the second inflatable chamber 204, respectively, during inflation. As will be understood from the examples that follow, in implementations of the system 300 for deploying the curtain airbag 200, the first inflator 210 can be selectively actuated separately from the second inflator 212, and vice versa, so that the first inflatable chamber 202 and the second inflatable chamber 204 are separately inflatable.

As shown in FIG. 4, the system 300 for deploying the curtain airbag 200 further includes an airbag control unit (ACU) 220. The ACU 220 is communicatively coupled with one or more event sensors 230 that provide the ACU 220 with information concerning the environmental conditions for the vehicle 10. The ACU 220 is further communicatively coupled with the first inflator 210 and the second inflator 212 to allow the ACU 220 to selectively actuate the first inflator 210 and the second inflator 212.

The ACU 220 may be one or multiple computers including a random access memory (RAM), a read-only memory (ROM) and a central processing unit (CPU) in addition to various input and output connections. Generally, the control functions of the ACU 220 described herein can be implemented by one or more software programs stored in internal or external memory and are performed by execution by the CPU. However, some or all of the functions could also be implemented by hardware components. It will be understood that the ACU 220 can be implemented as a dedicated controller for controlling the side curtain airbag assembly 100, and optionally other airbag assemblies, or, the ACU 220 can be embodied in other controllers of the vehicle 10.

As noted above, the ACU 220 is configured to identify one, some or all of the events for the vehicle for which the first coverage area CA1 and the second coverage area CA2 are configured to accommodate based on the environmental conditions for the vehicle 10 sensed by the one or more event sensors 230. The one or more event sensors 230 may be or include pressure sensors configured to sense the application of pressure to the exterior of the vehicle 10. The pressure sensors can be located in areas of the vehicle body structure 12 such as the front door 14 and the rear door 16, for instance, or in other portions of the vehicle body structure 12 such as the A-pillar 20, the B-pillar 18 or the C-pillar 22. Additionally, or alternatively, the one or more event sensors 230 may be or include accelerometers or other sensors configured to sense transverse acceleration of the vehicle 10. Additionally, or alternatively, the one or more event sensors 230 may be or include a gyro sensor or other sensor configured to sense rotation of the vehicle 10 about its longitudinal axis.

FIGS. 5A, 5B and 7A-C are rear sectional views showing the interior of the vehicle 10 during deployment of the curtain airbag 200. FIGS. 5A, 5B and FIGS. 7A-C, respectively, show two example constructions for the curtain airbag 200. In each of the example constructions, the curtain airbag 200 defines the first inflatable chamber 202 and the second inflatable chamber 204, and includes a shared panel 240 common to both the first inflatable chamber 202 and the second inflatable chamber 204.

According to the example constructions of the curtain airbag 200, two respective overlying auxiliary panels are connected to the shared panel 240 to define, with the shared panel 240, the first inflatable chamber 202 and the second inflatable chamber 204. The example constructions are generally described with reference to the above described example of the curtain airbag 200 that defines the first inflatable chamber 202 configured for inflation to at least partially provide the first coverage area CA1 and the second inflatable chamber 204 configured for inflation to at least partially provide the second coverage area CA2. It will however be understood that additional overlying auxiliary panels can be connected to the shared panel 240 to define, with the shared panel 240, respective alternative or additional inflatable chambers configured for inflation to at least partially provide other coverage areas.

The shared panel 240 can be sized, shaped and otherwise configured according to the desired coverage areas to be provided by the curtain airbag 200 upon the entry of the curtain airbag 200 into the passenger compartment of the vehicle 10. Once again in accordance with the example first coverage area CA1 and the example second coverage area CA2 described above and shown in FIG. 3, where the second coverage area CA2 overlaps the first coverage area CA1, the shared panel 240 is sized and shaped to continuously extend in the longitudinal direction of the vehicle 10 and span the height of the window opening 13, in order to support the provision of the second coverage area CA2. It will however be understood that the shared panel 240 could have other sizes, shapes and configurations in accordance with other coverage areas, including configurations in which the shared panel 240 does not extend continuously.

In the illustrated example, the shared panel 240 has an upper periphery 242a that extends in the longitudinal direction of the vehicle 10 above the upper portions of the window opening 13, an opposing lower periphery 242b that extends in the longitudinal direction of the vehicle 10 below the lower portions of the window opening 13 and a central portion 242c between the upper periphery 240a and the lower periphery 240b. As shown, the shared panel 240 is attached to the vehicle 10 at its upper periphery 242a with an attachment 246. The attachment 246 can be implemented with a fastener as generally shown with other types of attachments. The shared panel 240 further has an inner side 244a facing the interior of the vehicle 10 and an opposing outer side 244b facing toward the window opening 13.

In the example construction for the curtain airbag 200 shown in FIGS. 5A and 5B, a first auxiliary panel 250 overlays the inner side 244a of the shared panel 240 and is connected to the shared panel 240 to define, with the shared panel 240, the first inflatable chamber 202. As shown, the first inflatable chamber 202 is oriented toward the interior of the vehicle 10.

In this example, the first inflatable chamber 202 is configured for inflation to generally individually provide the first coverage area CA1 over the window opening 13. In other words, the first coverage area CA1 is provided over the window opening 13 regardless of whether the second inflatable chamber 204 is inflated. As shown, in accordance with the example first coverage area CA1 described above and shown in FIG. 3, the first auxiliary panel 250 can be connected to the shared panel 240 along its upper periphery 242a by a seam 252 and along its central portion 242c by a seam 254. The seam 252 can be implemented with sewing, stitching, an adhesive, hook and loop type fasteners, staples, grommets and/or rivets, for instance, either alone or in combination with the attachment 246. The seam 254 can similarly be implemented with sewing, stitching, an adhesive, hook and loop type fasteners, staples, grommets and/or rivets, for instance.

A second auxiliary panel 260 overlays the outer side 244b of the shared panel 240 and is connected to the shared panel 240 to define, with the shared panel 240, the second inflatable chamber 204. As shown, the second inflatable chamber 204 is oriented toward the window opening 13.

In this example, the second inflatable chamber 204 is configured for inflation to generally provide the second coverage area CA2 over the window opening 13 in collaboration with the first inflatable chamber 202. In other words, in order for the second coverage area CA2 over the window opening 13 to be provided, both the first inflatable chamber 202 and the second inflatable chamber 204 are inflated. As shown, in accordance with the example first coverage area CA1 and the example second coverage area CA2 described above and shown in FIG. 3, the second auxiliary panel 260 can be connected to the shared panel 240 along its central portion 242c by the seam 254 and along its lower periphery 242b by a seam 262. The seam 254, as shown, may be common to both the first auxiliary panel 250 and the second auxiliary panel 260. It will be understood however that the first auxiliary panel 250 and the second auxiliary panel 260 could each be connected to the shared panel 240 along its central portion 242c with separate seams. Similarly to the seam 252 and the seam 254, the seam 262 can be implemented with sewing, stitching, an adhesive, hook and loop type fasteners, staples, grommets and/or rivets, for instance.

Figure 6:
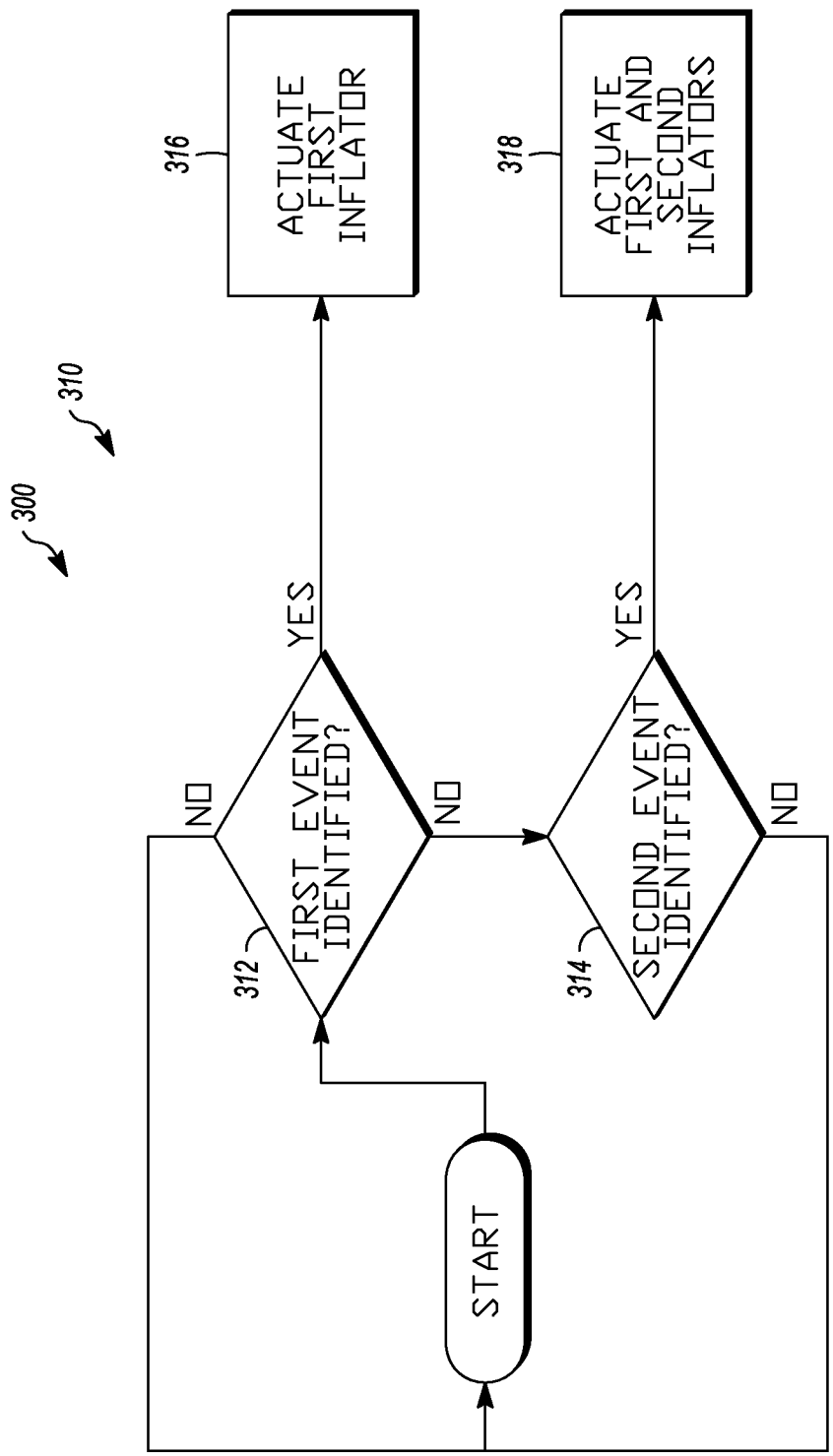
FIG. 6 is a flow diagram showing operations for deploying the curtain airbag with the first example construction.

Example operations of a process 310 for implementation by the system 300 for deploying the curtain airbag 200 according to the example construction shown in FIGS. 5A and 5B are shown in FIG. 6.

In operation 312, if a first event is identified, the first inflator 210 is actuated in operation 316 to inflate the first inflatable chamber 202 and provide the first coverage area CA1 over the window opening 13 upon the ensuing entry of the curtain airbag 200 into the passenger compartment of the vehicle 10, as shown in FIG. 5A.

If a first event is not identified, the process 310 proceeds to operation 314. In operation 314, if a second event is identified, both the first inflator 210 and the second inflator 212 are actuated in operation 318 to inflate both the first inflatable chamber 204 and the second inflatable chamber 204, with the first inflatable chamber 202 and the second inflatable chamber 204 in conjunction providing the second coverage area CA2 over the window opening 13 upon the ensuing entry of the curtain airbag 200 into the passenger compartment of the vehicle 10, as shown in FIG. 5B.

Figure 7C:
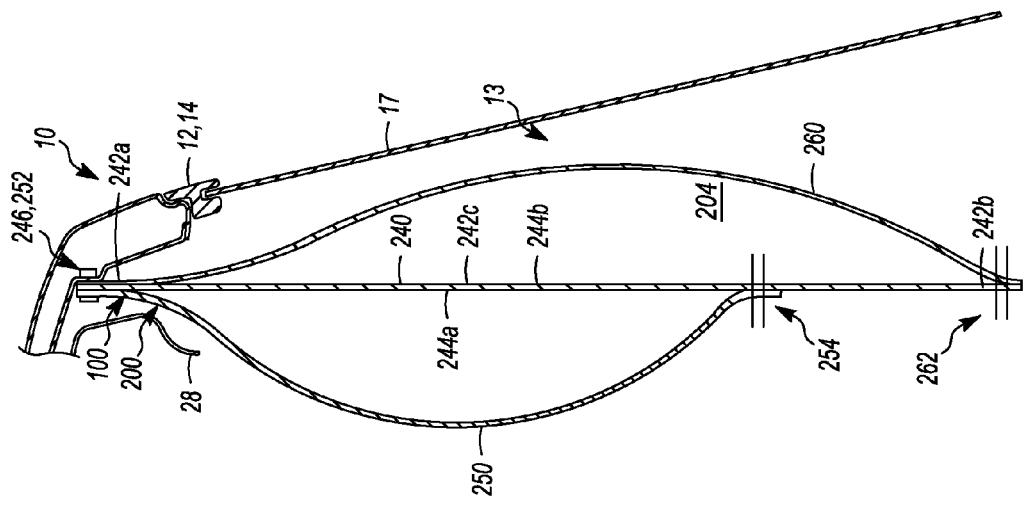
FIGS. 7A-C are rear sectional views of the vehicle taken along the line A-A in FIG. 3 showing the curtain airbag assembly during deployment of the curtain airbag according to a second example construction.
Figure 7B:
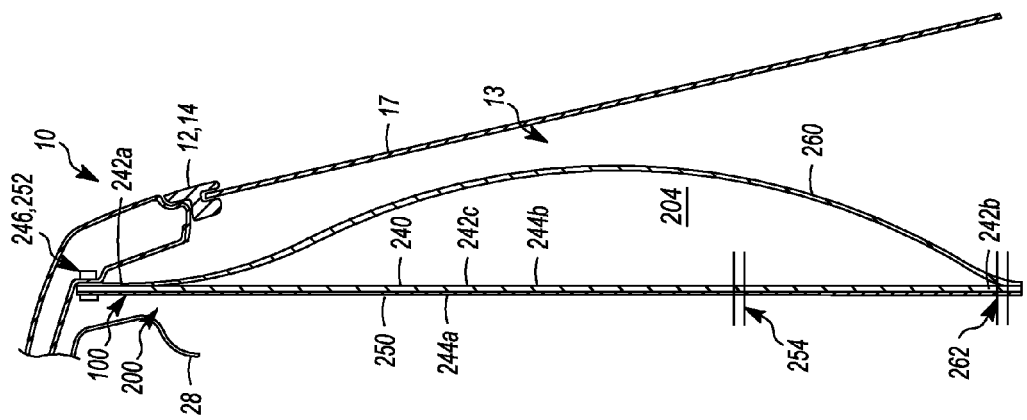
Figure 7A:
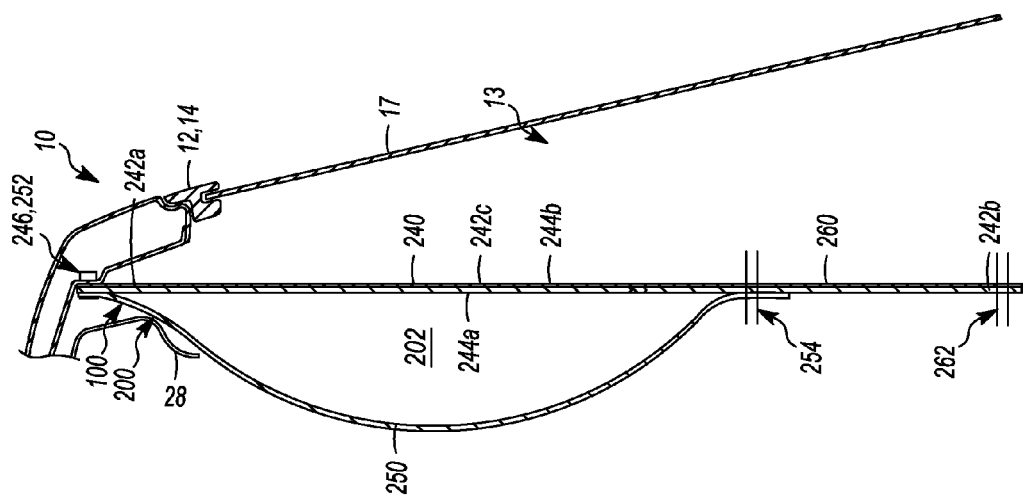

The example construction for the curtain airbag 200 shown in FIGS. 7A-C is similar to the example construction for the curtain airbag 200 shown in FIGS. 5A and 5B, except that the second inflatable chamber 204 is configured for inflation to generally individually define the second coverage area CA2 over the window opening 13. In other words, the second inflatable chamber 204 can solely define the second coverage area CA2 over the window opening 13 regardless of whether the first inflatable chamber 202 is inflated. As shown, in accordance with the example second coverage area CA2 described above and shown in FIG. 3, the second auxiliary panel 260 can be connected to the shared panel 240 along its upper periphery 242a by the seam 252 and along its lower periphery 242b by the seam 262.

Figure 8:
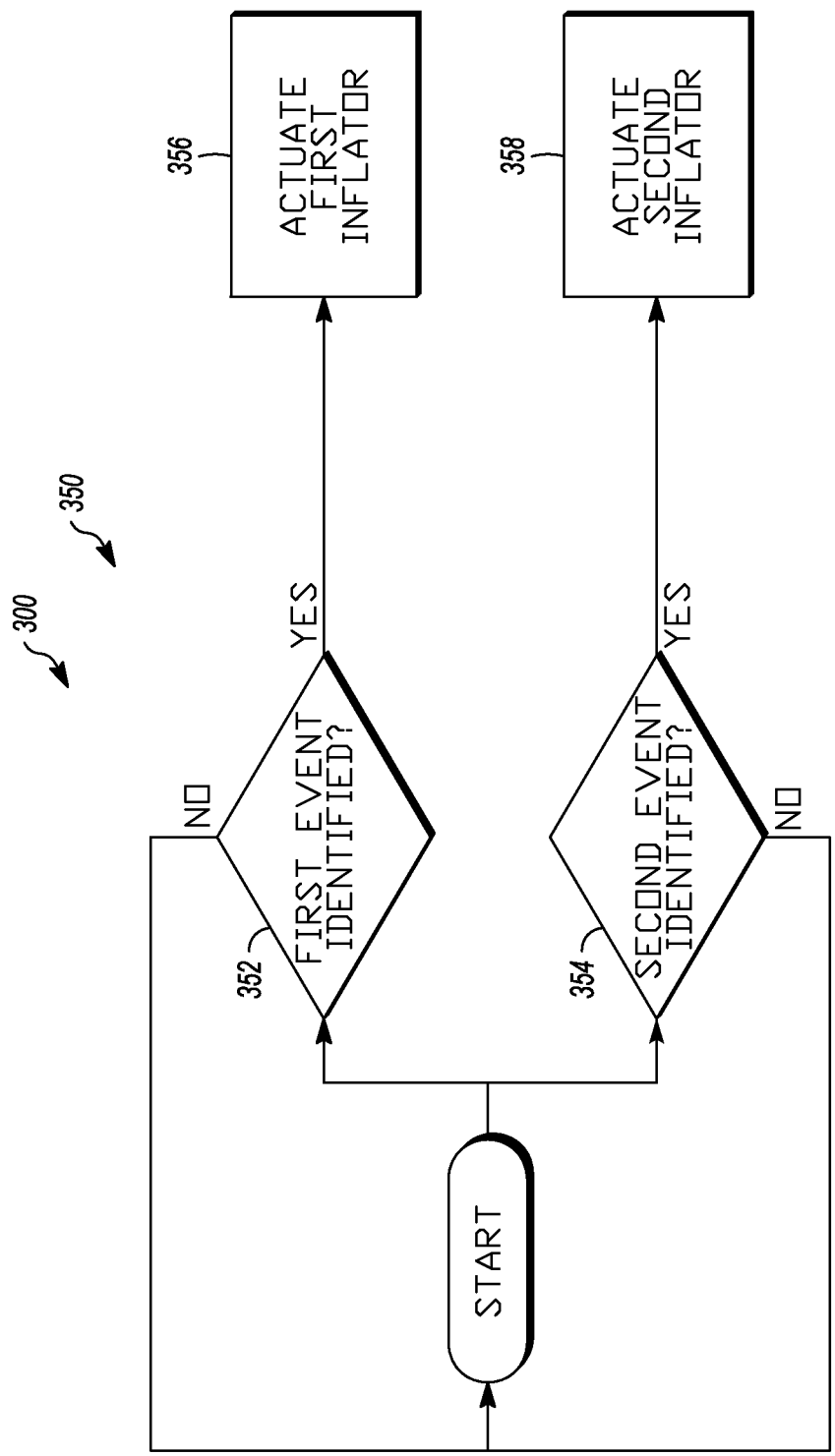
FIG. 8 is a flow diagram showing operations for deploying the curtain airbag with the second example construction.

Example operations of a process 350 for implementation by the system 300 for deploying the curtain airbag 200 according to the example construction shown in FIGS. 7A-C are shown in FIG. 8.

In operation 352, if a first event is identified, the first inflator 210 is actuated in operation 356 to inflate the first inflatable chamber 202 and provide the first coverage area CA1 over the window opening 13 upon the ensuing entry of the curtain airbag 200 into the passenger compartment of the vehicle 10, as shown in FIG. 7A.

In parallel operation 354, if a second event is identified, the second inflator 212 is actuated in operation 358 to inflate the second inflatable chamber 204 and provide the second coverage area CA2 over the window opening 13 upon the ensuing entry of the curtain airbag 200 into the passenger compartment of the vehicle 10, as shown in FIG. 7B.

If both a first event is identified in operation 352 and a second event is identified in operation 354, then the first inflator 210 is actuated in operation 356 to inflate the first inflatable chamber 202 and the second inflator 212 is actuated in operation 358 to inflate the second inflatable chamber 204, as shown in FIG. 7C.

The material properties of the shared panel 240, the first auxiliary panel 250 and the second auxiliary panel 260 of the curtain airbag 200 can be configured in support of the purposes of providing the respective first coverage area CA1 and second coverage area CA2 over the window opening 13. The first auxiliary panel 250, for example, can have a permeability to inflation gas that allows the first inflatable chamber 202 to maintain a surface tension conducive to providing among other things energy dissipation capacity along the window opening 13 of the vehicle 10 once inflated (e.g., during an impact event involving laterally directed forces). The second auxiliary panel 260, for example, can have a relatively lower permeability to inflation gas that allows the second inflatable chamber 204 to maintain a higher surface tension conducive to providing among other things a countermeasure in an ejection mitigation system for the vehicle 10. In either or both of these examples, the shared panel 240 can be substantially impermeable to inflation gas to fluidly isolate the first inflatable chamber 202 from the second inflatable chamber 204.

While the description herein is made with respect to specific implementations, it is to be understood that the invention is not to be limited to the disclosed implementations but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A curtain airbag for providing multiple coverage areas over a window opening, comprising:
    a shared panel sized to span a height of the window opening upon deployment of the curtain airbag, the shared panel having an upper periphery, an opposing lower periphery and a central portion between the upper periphery and the lower periphery;
    a first auxiliary panel connected to the shared panel at least along the upper periphery and along the central portion of the shared panel to define a first inflatable chamber configured for inflation to at least partially provide a first coverage area; and
    a second auxiliary panel connected to the shared panel at least along the lower periphery and along the central portion of the shared panel to define a second inflatable chamber configured for inflation to at least partially provide a second coverage area, wherein a common seam connects both the first auxiliary panel and the second auxiliary panel to the shared panel along the central portion of the shared panel.

2. The curtain airbag of claim 1, wherein the shared panel has an inner side and an opposing outer side, with the first auxiliary panel overlying the inner side, and the second auxiliary panel overlying the outer side.

3. The curtain airbag of claim 1, wherein the first auxiliary panel has a higher permeability to inflation gas than that of the second auxiliary panel.

4. The curtain airbag of claim 1, wherein the shared panel is substantially impermeable to inflation gas.

5. The curtain airbag of claim 1, wherein the first inflatable chamber and the second inflatable chamber each define a respective inflation aperture for receiving inflation gas.

6. A vehicle, comprising:
    a body structure defining a window opening;
    a curtain airbag for providing multiple coverage areas over the window opening, the curtain airbag having:
        a shared panel sized to span a height of the window opening upon deployment of the curtain airbag, the shared panel having an upper periphery, an opposing lower periphery and a central portion between the upper periphery and the lower periphery,
        a first auxiliary panel connected to the shared panel at least along the upper periphery and along the central portion of the shared panel to define a first inflatable chamber configured for inflation to at least partially provide a first coverage area, and
        a second auxiliary panel connected to the shared panel at least along the lower periphery and along the central portion or the upper periphery of the shared panel to define a second inflatable chamber configured for inflation to at least partially provide a second coverage area; and a system for deploying the curtain airbag, the system configured to separately inflate the first inflatable chamber and the second inflatable chamber by identifying a first event for the vehicle and inflating the first inflatable chamber based on the identified first event, and identifying a second event for the vehicle and inflating the second inflatable chamber based on the identified second event.

7. The vehicle of claim 6, wherein the second auxiliary panel is connected to the shared panel at least along the lower periphery and along the upper periphery of the shared panel.

8. The vehicle of claim 6, wherein the shared panel has an inner side for facing an interior of the vehicle and an opposing outer side for facing toward the window opening upon the curtain airbag's deployment, with the first auxiliary panel overlying the inner side, and the second auxiliary panel overlying the outer side.

9. The vehicle of claim 6, wherein the first auxiliary panel has a higher permeability to inflation gas than that of the second auxiliary panel.

10. The vehicle of claim 6, wherein the shared panel is substantially impermeable to inflation gas.

11. The vehicle of claim 6, wherein the system for deploying the curtain airbag includes:
a first inflator fluidly coupled to the first inflatable chamber for providing inflation gas during inflation; and
a second inflator fluidly coupled to the second inflatable chamber for providing inflation gas during inflation.

12. The vehicle of claim 6, wherein the system for deploying the curtain airbag is configured to inflate both the first inflatable chamber and the second inflatable chamber based on the identified second event, regardless of the identification of the first event.

13. A curtain airbag for providing multiple coverage areas over a window opening, comprising:
a shared panel;
a first auxiliary panel connected to the shared panel and cooperating with the shared panel to define a wall of a first inflatable chamber; and
a second auxiliary panel connected to the shared panel and cooperating with the shared panel to define a wall of a second inflatable chamber, wherein
the shared panel contacts inflation gas in the first inflatable chamber when the first inflatable chamber is inflated; and
the shared panel contacts inflation gas in the second inflatable chamber when the second inflatable chamber is inflated, with respective inflatable chambers being fluidly isolated from one another and defining respective inflation apertures for receiving inflation gas from different sources.

14. The curtain airbag of claim 13, wherein:
the shared panel is sized to span a height of the window opening upon deployment of the curtain airbag, and has an upper periphery, an opposing lower periphery and a central portion between the upper periphery and the lower periphery;
the first auxiliary panel is connected to the shared panel at least along the upper periphery and along the central portion of the shared panel; and
the second auxiliary panel is connected to the shared panel at least along the lower periphery and along one of the central portion or the upper periphery of the shared panel.

15. The curtain airbag of claim 14, wherein the second auxiliary panel is connected to the shared panel at least along the lower periphery and along the central portion of the shared panel, and a common seam connects both the first auxiliary panel and the second auxiliary panel to the shared panel along the central portion of the shared panel.

16. The curtain airbag of claim 14, wherein the second auxiliary panel is connected to the shared panel at least along the lower periphery and along the upper periphery of the shared panel.

17. The curtain airbag of claim 13, wherein the shared panel has an inner side and an opposing outer side, and the first auxiliary panel overlies the inner side and the second auxiliary panel overlies the outer side.

18. The curtain airbag of claim 13, wherein the shared panel is substantially impermeable to inflation gas.

\* \* \* \* \*